Figure 1:
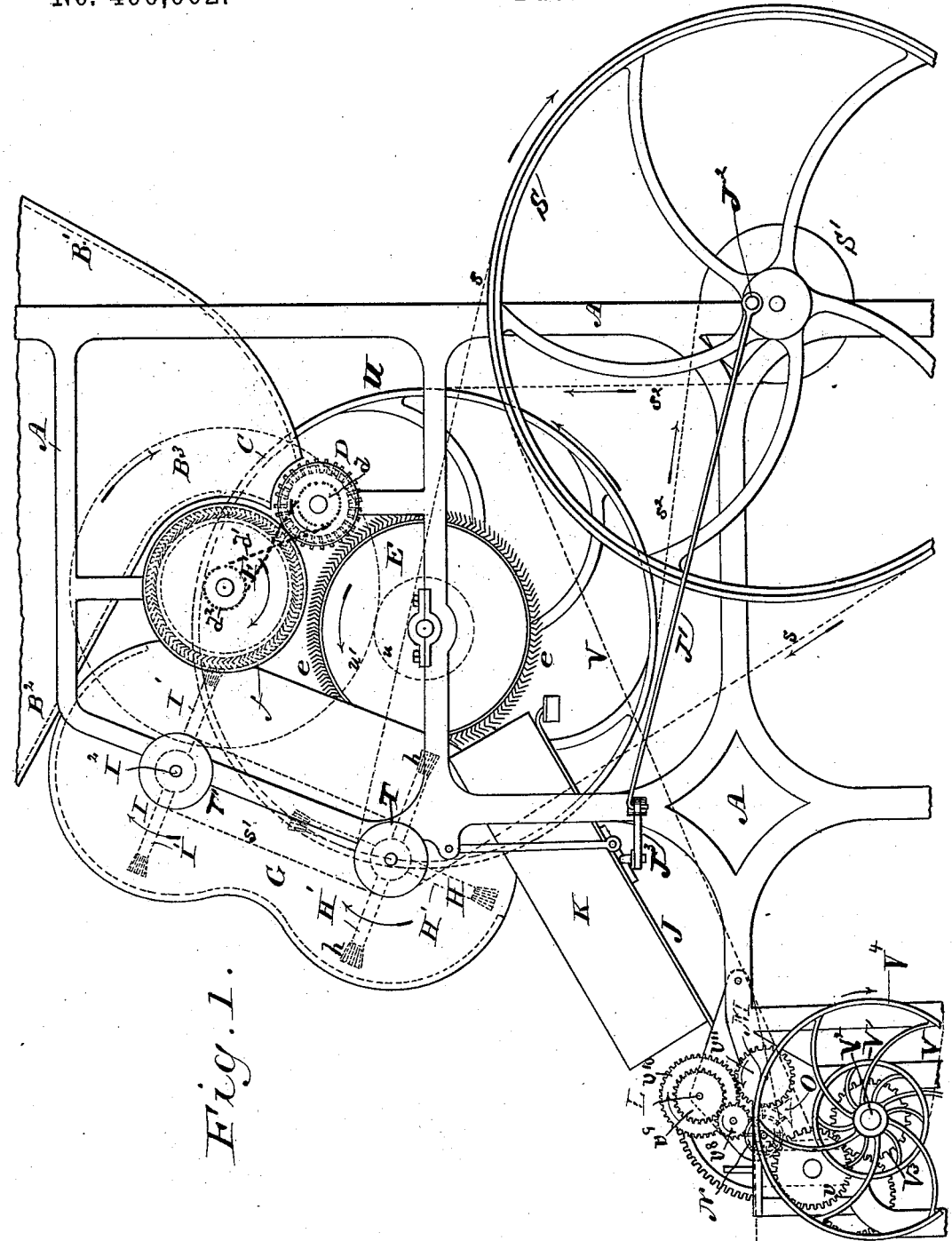

(No Model.) 3 Sheets—Sheet 1.
J. R. MONTAGUE.
MACHINE FOR OPENING, CLEANING, AND GINNING SEED COTTON.
No. 400,002. Patented Mar. 19, 1889.

WITNESSES
H. C. Newman
O. S. Newman

INVENTOR,
John R. Montague,
By his Attorneys
Baldwin Davidson & Wight

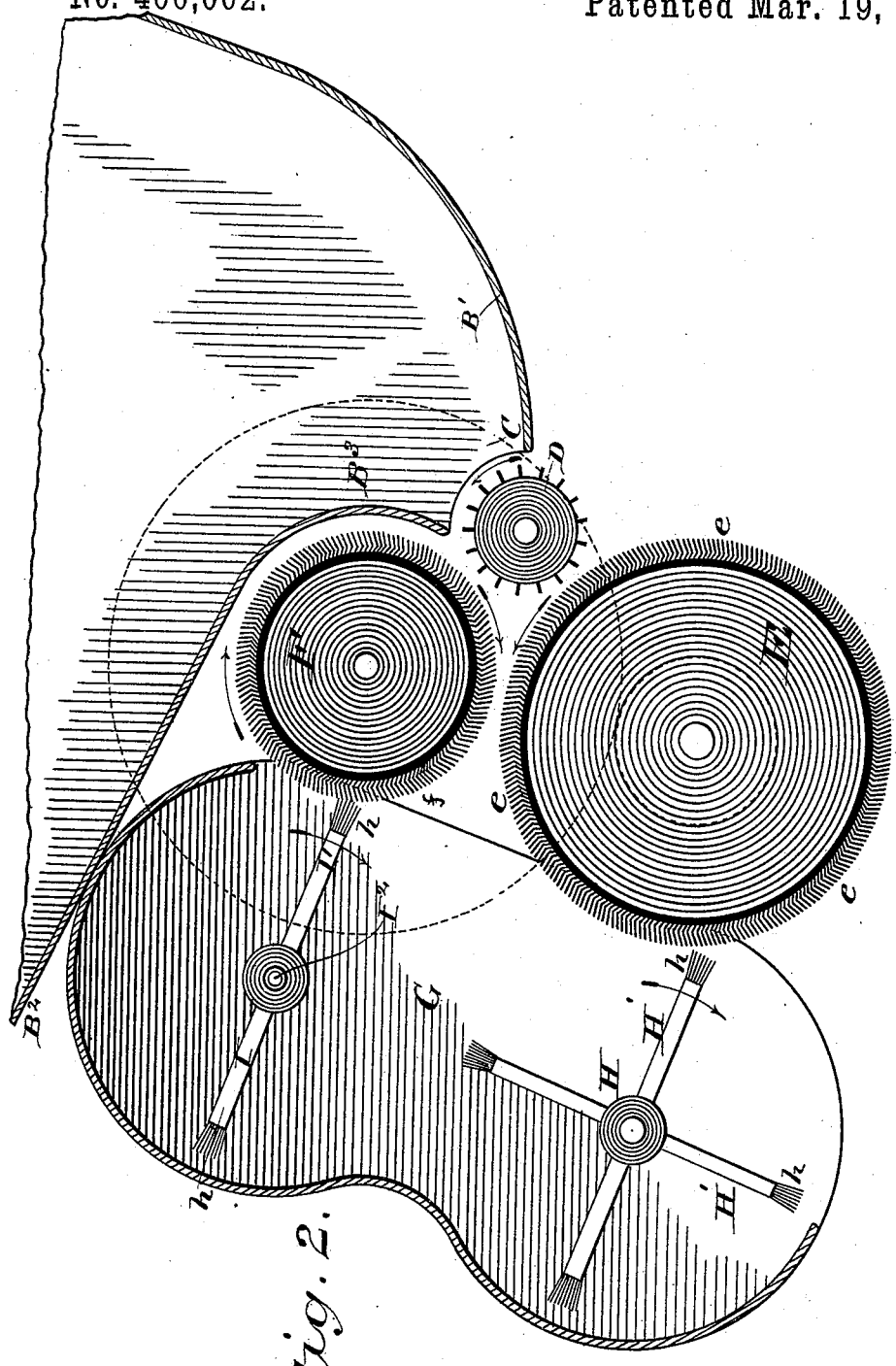

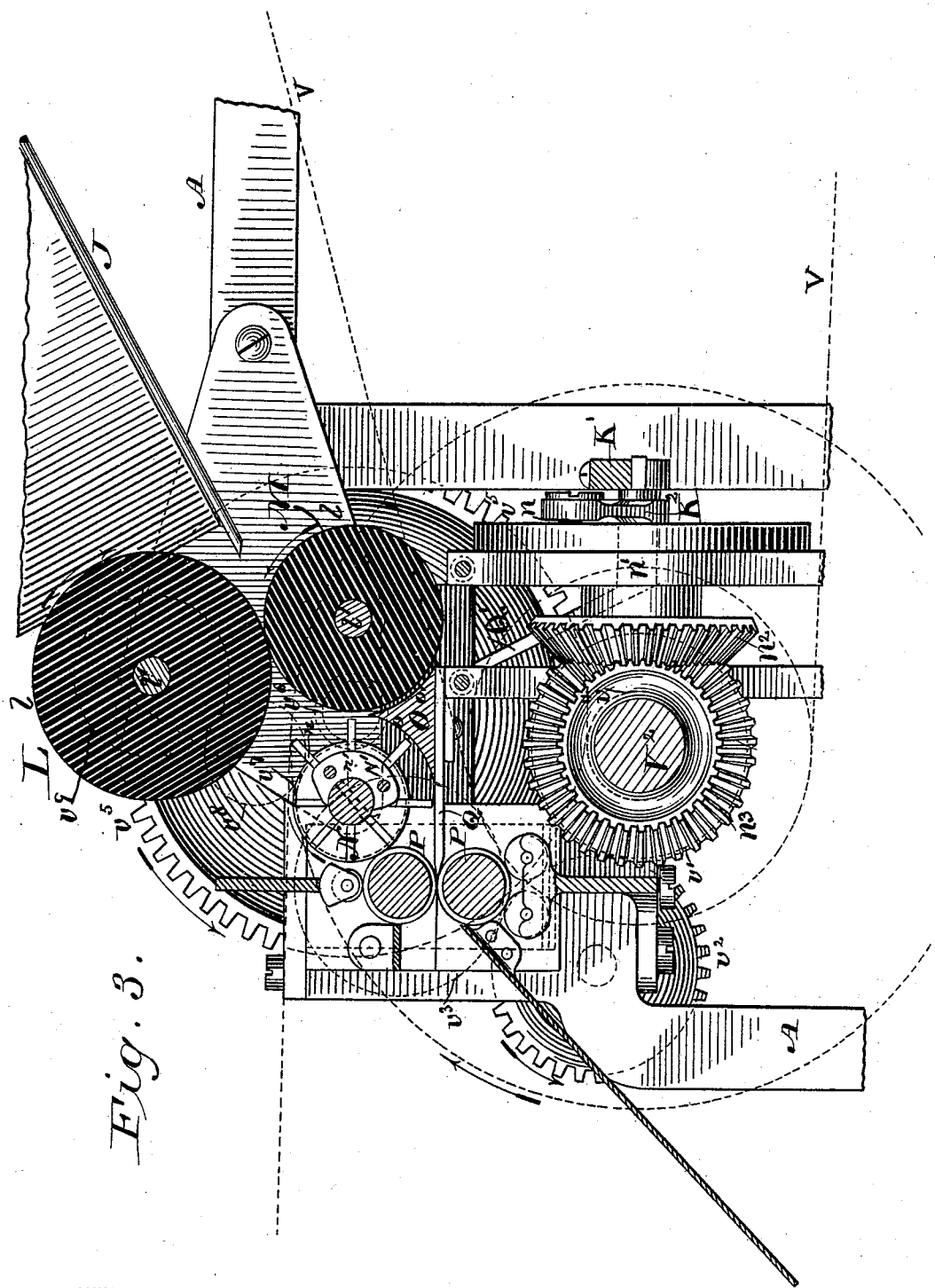

UNITED STATES PATENT OFFICE.

JOHN RICHARD MONTAGUE, OF AUBURN, NEW YORK, ASSIGNOR TO THE MONTAGUE ROLLER COTTON GIN COMPANY, OF TOLEDO, OHIO.

MACHINE FOR OPENING, CLEANING, AND GINNING SEED-COTTON.

SPECIFICATION forming part of Letters Patent No. 400,002, dated March 19, 1889.

Application filed April 24, 1888. Serial No. 271,708. (No model.)

*To all whom it may concern:*

Be it known that I, JOHN RICHARD MONTAGUE, a citizen of the United States, residing at Auburn, in the county of Cayuga and State of New York, have invented certain new and useful Improvements in Machinery for Opening, Cleaning, and Ginning Seed-Cotton, of which improvements the following is a specification.

My invention more especially relates to that class of machinery for cleaning seed-cotton known as the "roller-gin," and constitutes an improvement upon the invention shown in my patent, No. 383,754, granted May 29, 1888.

The first part of my invention relates to the devices for feeding the seed-cotton from the hopper to the gin. Its object is to insure a regular delivery of the cotton from the hopper, and to open the cotton-boll immediately after it has passed from the hopper, and to draw out, separate, and spread the seeds apart, so as to facilitate the subsequent treatment of the seed-cotton. This end I attain by arranging at the discharge-opening of the hopper a toothed roller adapted to draw the seed-cotton from the hopper and deliver it to the mechanism for opening the boll and separating the seeds, and in combining with this roller a pair of rollers of different diameters having differential speed and provided with teeth arranged at a proper distance from each other on the opposite rolls to permit the seed-cotton to pass between them, but close enough together to act on the seed-cotton properly to open the boll and separate the seed, as above explained.

The next part of my invention relates to the devices for cleaning the seed-cotton as it passes on its way from the hopper to the ginning-rolls; to which end my improvement consists in combining with the hopper and with toothed rollers of different diameters and having differential speed, between which the seed-cotton passes, shafts provided with wings or beaters provided with brushes and revolving in proximity to but more rapidly than the toothed rollers, so as to beat out dust and other impurities and clear the teeth of adhering cotton fibers and seed.

The next part of my invention relates to the devices for feeding the seed-cotton to the rolls; to which end my improvement consists in combining with the ginning-rolls a pair of rolls for flattening and condensing the seed-cotton, and in arranging between the flattening rolls and the ginning-rolls means for grasping and retarding the seed-cotton and insuring its regular delivery to the ginning-rolls.

The next part of my invention relates to the mechanism for feeding the seed-cotton to the ginning-rolls and for ginning it.

To this end my improvement consists in combining rollers of any suitable material of comparatively small diameter, rotated in close proximity to each other, (between which the ginned cotton passes,) with a feed-roller arranged parallel therewith containing parallel longitudinal radially-reciprocating ribs, which are alternately thrust out to seize and carry the cotton to the rolls at regulated speed, and then are retracted to allow the seed-cotton to pass freely to the rolls, and with a pair of rollers adapted to flatten and condense the fiber of the seed-cotton immediately before its delivery to the ribbed feed-roller. By this means the fibers of the seed-cotton are delivered to the ribbed feed-roller in a condensed and flattened condition, so as to be readily fed forward by the feed-roller to the ginning-rollers.

My invention further consists in combining with the ginning-rolls, feed-roll, and flattening-rolls above mentioned a separating-block provided with concave sides, in proximity to which the feeding-roll and the lower flattening-roll revolve.

The accompanying drawings represent all the improvements herein claimed, as embodied in one apparatus, in the best way now known to me. Some of them, however, may be used without the others, and in machines differing in their details of construction from those herein described.

Figure 1 is a partial side elevation of my improved machine. Fig. 2 is a longitudinal central section through the hopper, the toothed rollers, and the beaters; and Fig. 3 is a side view, partly in section, of the ginning, feeding, and flattening mechanism.

The main frame A may be constructed of any suitable material and in any desired way. The hopper B' B² is arranged at the front end of the machine, and is preferably formed with an inclined front end, B', and an inclined rear end, B², having a curved portion, B³, bent backward and terminating a suitable distance from the end of the front B' to form a discharge-opening, C. The discharge-opening C extends across from one side of the hopper to the other. The toothed feed-roller D is arranged at the discharge-opening, and is revolved by suitable gearing in the direction indicated by the arrow to deliver the seed-cotton to the toothed rollers E and F, which extend from one side of the machine to the other in rear of the feed-roller D. The roller E is preferably somewhat larger than the roller F. As shown in the drawings, the diameter of the roller F is about two-thirds that of the roller E. These rollers are arranged and geared together and to suitable driving mechanism, as shown in the drawings, to revolve at different speeds—that is, the roller E revolves faster than the roller F. I preferably arrange the upper roller, F, on one side of a vertical line drawn through through the axis of the roller E, as indicated in the drawings. The roller E is covered with teeth $e$, preferably card-teeth, as shown, and the roller F is similarly covered with card-teeth $f$, which, on the side adjacent to the roller E, project from the surface of the roller in a direction opposite to that of the teeth on the roller E—that is, the teeth are opposing—so that while the teeth on the roller E hook into the fibers and tend to feed them forward the teeth on the roller F, which travel slower than those on the roller E and which are turned in an opposite direction, tend to hold on to the fibers, the effect of the two sets of teeth operating in this way being to open the boll and separate the seeds from one another.

Within a suitable casing, G, are arranged the beaters H and I, one set for each toothed roller. The lower beater preferably consists of four radial wings, H', provided on their outer ends with wipers or brushes $h$. The upper beater, I, preferably consists of a pair of wings, I', radiating from opposite sides of the shaft I². The beaters extend across the entire length of the rollers, so as to act on them to clean their entire surface. The beaters revolve in the direction indicated by the arrows, and the seed-cotton is delivered to an inclined grating, J, of the kind illustrated in my patent above mentioned. The grating J is made to vibrate by means of a pitman, J', connected eccentrically at J² to the driving-wheel S and to a bell-crank lever, J³, secured to the grating. On each side of this grating are arranged shields K, which prevent dust and lint from being thrown out by the beaters and insure the delivery of the seed-cotton to the flattening-rolls L M, arranged below the lower end of the grating. The flattening-rollers L M are arranged in suitable bearings in the main frame and extend from one side of the machine to the other, the upper roller, L, being preferably somewhat larger than the lower one. The rollers are geared and driven in any suitable way, so as to revolve at the same rate of speed. The rollers L and M are formed mainly of some soft pliable material, $l$, which readily yields when brought in contact with the seed-cotton as it passes between them. The material, $l$, is mounted on shafts $l'$.

The rollers are arranged so as to have their surfaces revolve in suitable proximity to each other, to most effectively act on the seed-cotton to flatten it out and feed it forward to the ribbed feeding-roll N, arranged between the flattening-rolls and the ginning-rolls. The feeding-roll N is similar in construction and operation to that shown in my before-mentioned patent. This feed-roller is mounted in suitable bearings in the frame and revolves parallel with and in close proximity to the ginning-rolls. It is shown in this instance as provided with eight radial slots, in which ribs or bars $n$ reciprocate freely transversely to its axis, these bars being connected by cross-pieces $n'$, so that as a bar is protruded on one side of the roller it is correspondingly retracted on the other. This movement is effected by a suitably-constructed cam, N', secured to the frame near the edge of the roller and bearing against the inner sides of the projecting ends of the proper ribs. As the roller revolves the ribs are successively protruded on one side of the roller, while the ribs on the opposite side are retracted. The retraction of the ribs is effected by the cross-pieces $n'$, which connect opposite ribs, so that as one rib is protruded it draws with it or retracts into the body of the roller the opposite rib. The roller N is arranged to revolve at the same speed as the flattening-rollers L and M, so that the seed-cotton is fed forward to the ginning-rolls in a compressed sheet without being unduly torn apart or bunched, but yet sufficiently retarded to insure its regular delivery to the ginning-rolls.

Between the feed-roller N and the lower flattening-roller, M, is arranged a separating-block, O, provided with a concave side, $o$, in proximity to which the ribs on the feed-roller pass, and with a concave side, $o'$, near which revolves the lower flattening-roller, M. The side $o$ constitutes a table, over which the cotton is carried by the feed-roll. The upper side, $o'$, of the separating-block is arranged close to the surface of the lower flattening-roller, M, so that the seed-cotton cannot pass under the roller, but is delivered on the concave surface $o$ and fed forward to the ginning-rollers. It is therefore not absolutely necessary that the separating-block should be concave at $o'$, as described.

The ginning-rolls P and the reciprocating toothed bar Q are similar in construction and operation to those shown in my before-mentioned patent, and are provided with suitable gearing to drive them at the required speed, as in the machine shown in my previous patent.

The gearing for actuating the moving parts of the machine may be widely varied without departing from my invention. As shown in the drawings, the main band-wheel S is connected by belting $s$ with a pulley, T, on the shaft of the lower beater, H, and a belt, $s'$, connects a pulley on the lower beater-shaft to the pulley T' on the upper beater-shaft.

A pulley, S', on the shaft of the main band-wheel, is connected by crossed belting $s^2$ with a pulley, U, on the shaft of the roller E. The roller E is in turn connected by cogs $u\,u'$ with the roller F. A pulley, $d$, on the roller D is connected by crossed belting $d'$ to a pulley, $d^2$, on the roller F. The band-wheel S is connected by belting V with a pulley, V', on the shaft $V^2$, which carries a gear-wheel, $V^3$. The shaft $V^2$ also carries a driving-wheel, $V^4$, which may be connected by belting with a suitable motor. The gear-wheel $V^3$ engages with a gear-wheel, $v$, on the axis of the lower ginning-roller. A gear-wheel, $v'$, on the opposite end of the driving-shaft $V^2$ engages with an idle-wheel, $v^2$, which in turn drives a spur-wheel, $v^3$, on the upper ginning-roll, by which means the rolls are caused to revolve in opposite directions. A small pinion, $v^4$, on the driving-shaft $V^2$ meshes with a large spur-gear, $v^5$, mounted in suitable bearings in the frame. A small gear-wheel, $v^6$, on the shaft of the wheel $v^5$ engages with a gear-wheel, $v^7$, on the shaft of the feed-roll N. The gear-wheel $v^7$ also engages with an idle-wheel, $v^8$, which in turn engages with a cog, $v^9$, on the upper flattening-roll, L. A larger gear-wheel, $v^{10}$, on the shaft of the flattening-roll L engages with a gear-wheel, $v^{11}$, on the lower flattening-roll, M. The reciprocating toothed bar Q is connected to a bar, Q', which extends downward and forward, and its outer end reciprocates in a guideway, K', in the frame. The arm is driven by a pitman, $K^2$, and a crank, $n$, mounted on a shaft, $n'$, carrying a bevel-gear, $n^2$, meshing with a bevel-pinion, $n^3$, on the driving-shaft. By this means the toothed bar is reciprocated.

I claim as my invention—

1. The combination, substantially as hereinbefore set forth, of the hopper having a discharge-opening, the toothed rollers having a differential speed, means for imparting to said rollers their respective speeds, the feed-roller interposed between the toothed rollers and the discharge-opening of the hopper, and means for driving the feed-roller.

2. The combination, substantially as hereinbefore set forth, of the hopper having a discharge-opening, the lower toothed roller, the upper toothed roller of smaller diameter than the lower roller, means for driving the rollers, the feed-roller interposed between the toothed rollers and the discharge-opening of the hopper, means for driving the feed-roller, the beaters for clearing the toothed rollers, and means for actuating them.

3. The combination, substantially as hereinbefore set forth, of the flattening-rolls, means for actuating them, the ginning-rolls, means for actuating them, the feed-roller having radially-reciprocating ribs to grasp and retard the seed-cotton and insure its regular delivery to the ginning-rolls, means for driving the roll and actuating the ribs, and the separating-block between the feed-roller and the lower flattening-roll.

4. The combination, substantially as hereinbefore set forth, of the ginning-rolls, means for driving them, the flattening-rolls, means for driving them, the feeding and retarding roll interposed between the ginning-rolls and the flattening-rolls, means for driving the feeding and retarding roll, and a table over which the cotton is carried by the feed-roll.

In testimony whereof I have hereunto subscribed my name.

JOHN RICHARD MONTAGUE.

Witnesses:
J. C. BURGDORF,
ARTHUR COPELAND.